United States Patent [19]
Janle

[11] 3,819,208
[45] June 25, 1974

[54] INSULATED EXHAUST PIPE CONNECTION
[75] Inventor: Werner Janle, Pontiac, Mich.
[73] Assignee: General Motors Corporation, Detroit, Mich.
[22] Filed: Nov. 24, 1972
[21] Appl. No.: 309,137

[52] U.S. Cl.................. 285/47, 285/55, 285/363
[51] Int. Cl.................... F16l 23/00, F16l 59/00
[58] Field of Search ........ 285/47, DIG. 5, 187, 363, 285/55, 368

[56] References Cited
UNITED STATES PATENTS
| | | | |
|---|---|---|---|
| 2,423,213 | 7/1947 | Weber | 285/47 |
| 2,886,945 | 5/1959 | Hofer | 285/187 X |
| 3,275,345 | 9/1966 | Waldron et al. | 285/47 |
| 3,280,849 | 10/1966 | Rendos et al. | 285/47 X |
| 3,574,357 | 4/1971 | Alexandru | 285/47 |

Primary Examiner—Thomas F. Callaghan
Attorney, Agent, or Firm—Robert J. Outland

[57] ABSTRACT

Means for connecting an insulated exhaust pipe to an exhaust transmitting member such as an insulated manifold reactor. In a preferred embodiment, the connection includes an outer flange fixed to the outer shell of the exhaust pipe and secured to the housing of the reactor and a thin sheet metal inner flange clamped between the exhaust pipe and outer flange and the reactor. The inner flange includes a tubular portion extending within the exhaust pipe and covering the gap provided to permit relative expansion of the inner exhaust pipe liner under operating temperatures. A high temperature seal ring and a gasket engage opposite sides of the sheet metal inner flange to prevent exhaust leakage through the connection and into the insulating materials of the connected members.

2 Claims, 2 Drawing Figures

INSULATED EXHAUST PIPE CONNECTION

BACKGROUND OF THE INVENTION

This invention relates to insulated exhaust system connections and more particularly to exhaust pipe connections for high temperature insulated exhaust systems of internal combustion engines for motor vehicles and the like.

Certain forms of exhaust emission control devices which have been and are being developed to limit undesirable emissions from the exhaust products of motor vehicle internal combustion engines are required to operate under conditions of sufficiently high temperature that insulation of the exhaust transmitting members, such as exhaust manifolds and exhaust pipes, is required. Such arrangements should be provided with means to connect the insulated exhaust pipe to the adjacent exhaust carrying member such as, for example, an exhaust manifold reactor that not only provides an adequate seal against the escape of exhaust gases but also protects the bolts or other fastening means against excessive temperatures which might freeze them in position, making difficult their removal for servicing or replacement.

SUMMARY OF THE INVENTION

The present invention provides an insulated exhaust pipe connection which includes means for adequately sealing the joint between an insulated exhaust transmitting member, such as an exhaust manifold reactor and its connecting insulated exhaust pipe. The invention contemplates seal and gasket means which further prevent the passage of exhaust gases into the insulating materials of the connected members. Provision of a thin metal inner flange member gives the further advantages of closing the expansion gap at the end of the inner exhaust pipe liner with an axially extending tubular portion and preventing excessive heat transfer to the exhaust pipe fastening means due to the limited cross section of the metal extending to the exterior surfaces.

These and other advantages of the invention will be more fully understood from the following description of a preferred embodiment taken together with the accompanying drawing.

DESCRIPTION OF THE PREFERRED EMBODIMENT

Figure 1:
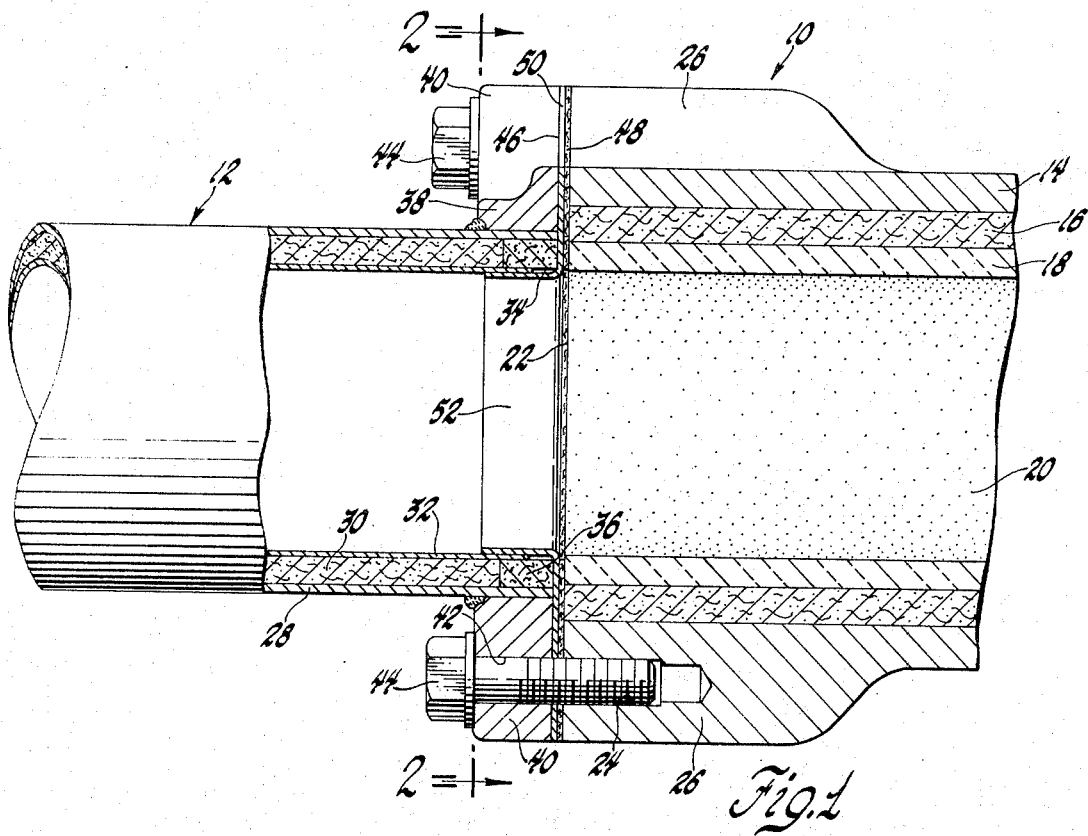
FIG. 1 is a longitudinal cross-sectional view of the connecting portions of an exhaust manifold reactor and an insulated exhaust pipe having connecting means according to the invention, the view being taken generally in the planes indicated by the Line 1—1 of FIG. 2.
Figure 2:
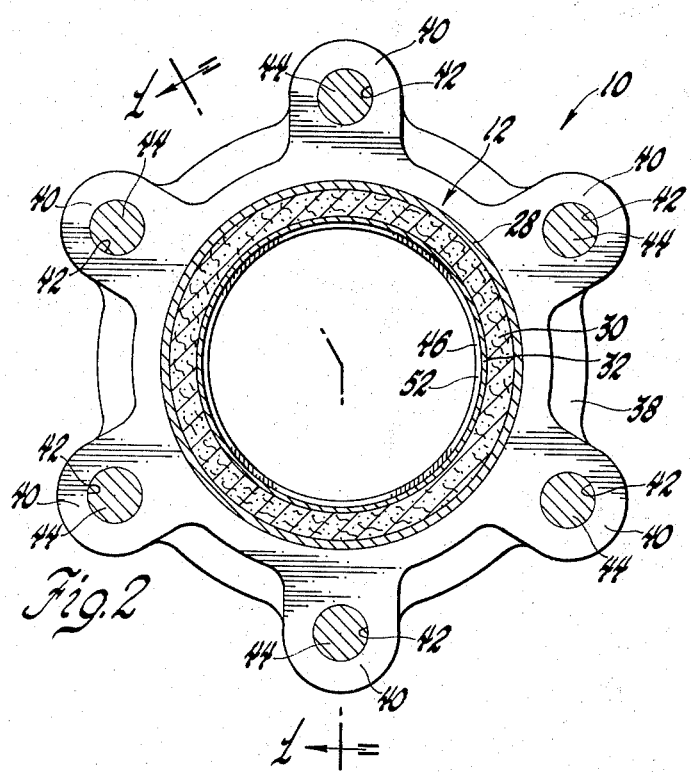
FIG. 2 is a transverse cross-sectional view of the arrangement of FIG. 1 taken in the plane indicated by the line 2—2 of FIG. 1.

Referring now more specifically to the drawing, numeral 10 generally indicates an exhaust transmitting member such as an exhaust manifold reactor for a motor vehicle internal combustion engine. Numeral 12 generally indicates an insulated exhaust pipe connected with the manifold reactor 10 to receive exhaust gases from the reactor and transmit them to other portions of the motor vehicle exhaust system.

Manifold reactor 10 includes an outer housing 14 preferably formed of metal such as cast iron or aluminum. Within the outer housing there is a layer 16 of thermal insulating material suitable for high temperature applications. An example of such material is fibrous alumina-silica ceramic available under the trade name Fiberfrax from the Carborundum Company of Niagara Falls, N.Y., U.S.A. Inside the thermal insulating layer is an inner wall or liner 18 preferably formed of an impervious ceramic or glass material and defining interiorly thereof a longitudinally extending exhaust gas passage 20. The various portions of reactor 10 terminate in an end wall 22 to which the exhaust gas passage 20 opens. A plurality of axially extending threaded openings 24 are provided in circumferentially spaced bosses 26 of the outer housing 14, opening through the end wall thereof at equi-angularly spaced locations around the exhaust gas passage 20.

The insulated exhaust pipe 12 includes a tubular steel outer shell 28 surrounding an intermediate layer 30 of thermal insulating material, such as Fiberfrax. On its inner surface the insulating material is retained and protected by a tubular inner liner 32 preferably formed of stainless steel sheet metal. The inner liner 32 is made shorter than the outer shell 28 leaving a gap 34 between the end of the inner liner and the end of the exhaust pipe 12 to provide space for the inner liner to expand under high operating temperatures without extending beyond the end of the outer shell 28. An annular seal ring 36, formed of suitable high temperature materials such as asbestos or ceramic is disposed between the inner liner 32 and outer shell 28 at the end of the exhaust pipe 12 and acts to prevent exhaust gases from entering the insulating material 30, as well as aiding in retaining this material in place during handling of the exhaust pipe before assembly.

An annular outer flange 38 is welded on the outer shell of the exhaust pipe at its end adjacent the reactor 10. Flange 38 includes a plurality of annularly spaced bosses 40 having axial openings 42 through which threaded bolts 44 extend into engagement with the threaded openings 24 of the reactor housing so as to hold the exhaust pipe and housing in assembly with the exhaust passages within the two connected bodies maintained coaxial.

The pipe connection of the invention also includes a stainless steel inner flange member 46 and a flat, high-temperature gasket 48 preferably formed of asbestos or the like. Flange 46 includes a flat radially extending portion 50 which is disposed between the end wall 22 of the exhaust reactor and the end of exhaust pipe 12 with its associated outer flange 38. The gasket 48 is compressed between the flat portion 50 of the inner flange 46 while the other side of this portion is engaged by the annular seal ring 36. Together the gasket and seal prevent the escape of exhaust gases either to atmosphere or into the insulating materials 16, 30 of the manifold reactor and exhaust pipe, respectively.

The inner flange 46 also includes a tubular portion 52 extending inwardly of and in close fitting relation to the inner liner 32 of the exhaust pipe so as to close the gap 34 and protect the seal 36 from direct exposure to exhaust gases in the flow stream.

The described arrangement provides for positive sealing of the exhaust pipe connection against the escape of exhaust gases, as well as protection of the insulating materials of the reactor and exhaust pipe at the joint between them. Also, because of the thin cross section of the sheet metal inner liner, very little heat is transmitted through the joint to the outer flange and housing and to the bolts connecting them, thereby avoiding the problem of seizure of the bolts due to overheating.

Although only a single embodiment has been described, this invention is intended to include such modifications as are encompassed by the language of the following claims.

I claim:

1. An exhaust connection comprising
   an exhaust transmitting member having a housing with an end wall and an exhaust gas passage opening through said end wall,
   an exhaust pipe member having a tubular metal outer shell spacedly surrounding a tubular gas passage defining impervious inner liner, said shell and liner together defining a thermal insluating space therebetween, said inner liner terminating short of the end of said outer shell when cold to allow said inner liner to expand relative to said outer shell under operating temperatures without extending beyond said outer shell,
   an outer flange fixed to said exhaust pipe outer shell at the end thereof,
   means securing said flange to the housing of said exhaust transmitting member opposite the end wall thereof, with said exhaust pipe inner shell coaxial with the exhaust gas passage of said exhaust transmitting member, and
   a thin inner flange member having an axially extending tubular portion connecting with a flat portion extending radially outwardly from one end of said tubular portion, said flat portion being sealingly secured between the end of said exhaust pipe member and its associated outer flange and the end wall of said exhaust transmitting member housing, said tubular portion extending within said exhaust pipe member, closely fitting with and overlapping the end of said inner liner to close the space between the inner liner and the end of the exhaust pipe against direct contact with the exhaust gases passing through said exhaust pipe member.

2. A insulated exhaust pipe connection comprising
   an insulated exhaust transmitting member including a heat resistant inner wall defining a passage for exhaust gases, a layer of thermal insulating material surrounding said inner wall and a cast metal housing surrounding said insulating material and separated thereby from said inner wall, said housing and inner wall having coplanar end walls and a plurality of threaded openings through said housing end wall and spaced around said exhaust gas passage,
   an insulated exhaust pipe having a tubular steel outer shell spacedly surrounding a concentric tubular impervious inner liner and a layer of thermal insulating material between the outer shell and inner liner, said outer shell extending slightly beyond the end of said inner liner when cold to permit expansion of the inner liner relative to the outer shell under operating temperatures without the inner liner extending beyond the outer shell,
   a high-temperature seal ring at the end of the exhaust pipe between said inner liner and outer shell and preventing penetration of exhaust gases into said exhaust pipe insulating material,
   a steel outer flange welded to the outer shell of said exhaust pipe at said end thereof, said flange having a plurality of bolt openings spaced around said exhaust pipe and aligned with the threaded openings of said exhaust transmitting member,
   threaded retaining means extending through said flange openings and engaging said threaded openings to secure said flange to said exhaust transmitting member opposite said housing end wall with said exhaust pipe inner shell coaxial with said member exhaust gas passage,
   a thin sheet metal inner flange member having an axially extending tubular portion connecting with a flat portion extending radially outwardly from one end of said tubular portion, said flat portion being secured between the end of said exhaust pipe and its associated outer flange and the end walls of said exhaust transmitting member housing and inner wall, said high-temperature seal ring engaging said flat portion to prevent leakage of exhaust gases between the inner flange member and the exhaust pipe end, and said tubular portion extending within said exhaust pipe, closely fitting with and overlapping the end of said inner liner to close the space between the inner liner and the end of the exhaust pipe and protect the seal ring against direct exposure to the main flow of exhaust gases, and
   a high temperature gasket compressed between the end walls of said exhaust transmitting member housing and inner wall and the flat portion of said inner flange member and sealing the space therebetween against the escape of exhaust gases therethrough.

* * * * *